April 23, 1963 N. W. BELL 3,087,121
SIGNAL CONTROLLED OSCILLATOR
Filed June 29, 1961
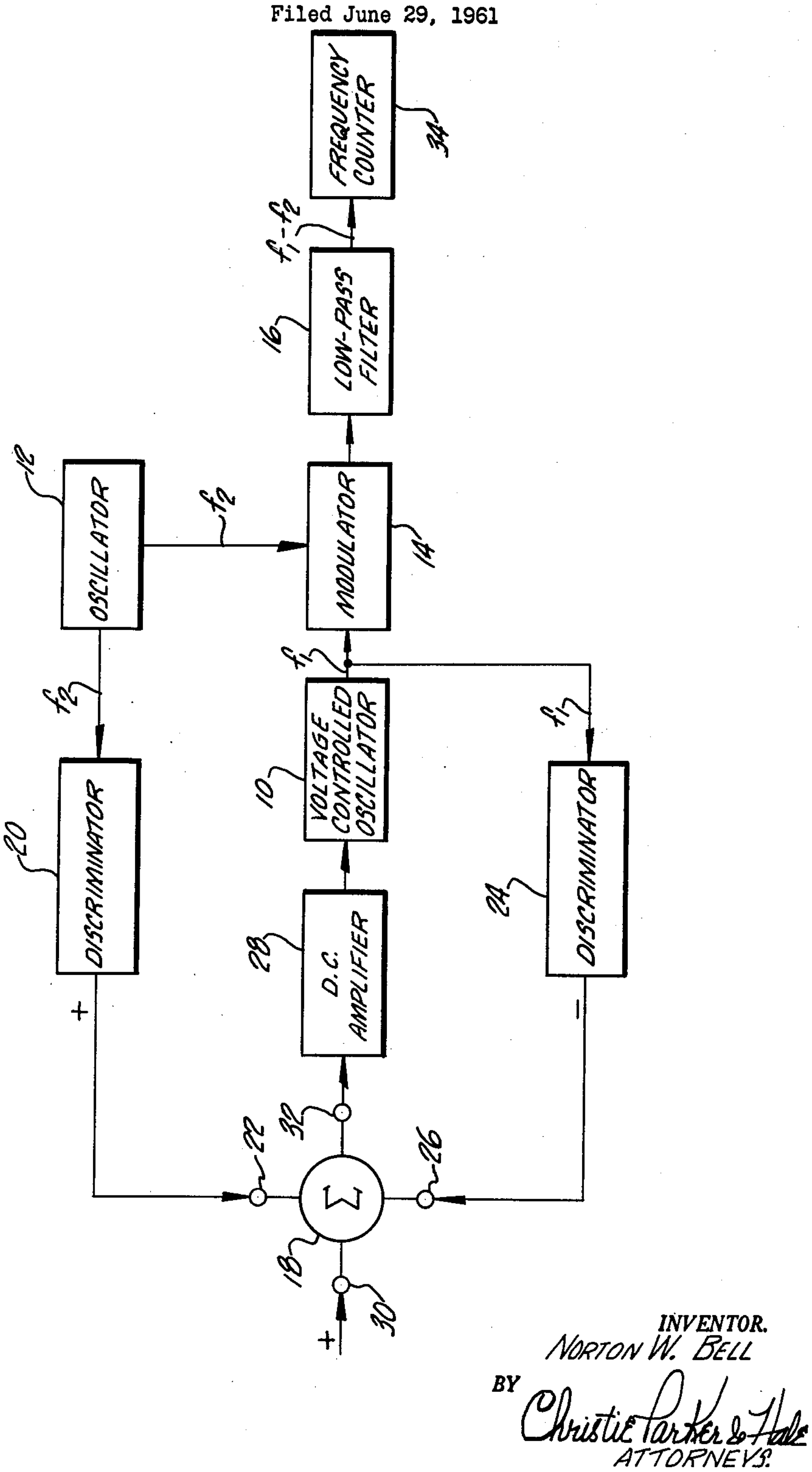
INVENTOR.
NORTON W. BELL
BY Christie, Parker & Hale
ATTORNEYS.

United States Patent Office 3,087,121

Patented Apr. 23, 1963

3,087,121

SIGNAL CONTROLLED OSCILLATOR

Norton W. Bell, Monrovia, Calif., assignor to Consolidated Electrodynamics Corporation, Pasadena, Calif., a corporation of California Filed June 29, 1961, Ser. No. 120,688
8 Claims. (Cl. 331—11)

This invention relates to apparatus for generating a signal of variable frequency and, more particularly, to apparatus for generating an alternating current output signal having a frequency which is directly proportional to the magnitude of a direct current input signal applied thereto.

Apparatus for generating a signal having a frequency which varies directly with the magnitude of a control signal applied thereto have found many different uses in the field of electronics. One such use is in the area of low level signal integration. Generally, signal integrator systems for integrating low level signals employ a voltage controlled oscillator the output of which is coupled to a frequency counter. In such systems, the signal to be integrated is applied to the voltage controlled oscillator. As the magnitude of a signal increases, the frequency of the signal generated by the voltage controlled oscillator likewise increases. Since the counter totals the number of cycles of oscillation, this total is proportional to the integral of the input signal at any time.

In general, in integrator systems of the type described above, to accurately integrate a signal, it is necessary that the frequency of the oscillator be proportional to the magnitude of the signal being integrated. Thus, as the magnitude of the signal increases from zero to some finite value and returns to zero, the frequency of the signal generated by the oscillator should increase from zero to a maximum frequency that is directly related to the maximum magnitude of the signal and then return to zero frequency. Generally, however, variable oscillators which operate down to zero frequency are nonlinear and have poor drift characteristics. Thus, when utilized they are in integrator systems such as that described above, the count stored in the counter may not represent an accurate measure of the integral of the signal wave form.

In view of the above, the present invention provides apparatus for generating a signal which is controllable over a frequency range extending from zero frequency and is directly proportional to the magnitude of the control signal applied thereto.

To accomplish this, the present invention in a basic form includes means for generating a variable frequency output signal having a frequnecy which is equal to a frequency difference between signals generated by a fixed frequency signal source and a variable frequency signal source. To selectively control the frequency of the output signal such that it varies directly with the magnitude of the control signal, the present invention includes means for selectively controlling the frequency of the signal generated by the variable frequency signal source. Briefly, the frequency control means of the present invention includes means for adding the control signal with a negative feedback signal which is proportional to the frequency of the variable frequency signal and a direct current signal which is proportional to the fixed frequency signal.

In particular, due to the negative feedback provided by the present invention, when a control signal of zero magnitude is applied at the input of the variable frequency signal source, the frequency of the signal generated by the variable frequency signal source is equal to the fixed frequency generated by the fixed frequency signal source. This results in an output signal of zero frequency. Further, since the present invention provides negative feedback around the variable frequency signal source, the frequency of the signal generated thereby varies in a direct manner with changes in the magnitude of the control signal applied thereto.

Accordingly, the present invention provides apparatus for developing an output signal the frequency of which is variable over a frequency range extending from zero frequency in direct proportion to the magnitude of the control signal applied thereto.

The above as well as other features of the present invention may be more clearly understood by reference to the drawing, the single FIGURE of which represents in block diagram form a preferred embodiment of the present invention.

As represented in block diagram form, the present invention includes apparatus for generating an output signal having a frequency which is equal to a difference in frequency between the signals generated by a variable frequency signal source represented as a voltage controlled oscillator 10 and a fixed frequency signal source represented by the oscillator 12. To produce the output signal, the present invention as represented in the drawing includes a modulator 14, which may be of a balanced modulator type, producing a signal having frequency components of the sum and difference between the frequencies of the signals generated by the voltage controlled oscillator 10 and the oscillator 12.

To develop the output signal having a frequency equal to a difference between the signals generated by the voltage controlled oscillator 10 and the oscillator 12, the present invention as represented in the drawing includes a low-pass filter 16.

As described briefly above, the present invention contemplates means for selectively controlling the frequency of the output signal by controlling the frequency of the signal generated by the variable frequency signal source. To accomplish this, the present invention includes means for selectively controlling the magnitude of the voltage signal applied to the input of the voltage controlled oscillator 10 such that the frequency of the signal generated thereby is directly proportional to the magnitude of an externally developed signal. To provide the desired control, the present invention includes means for developing a signal proportional to the frequency of the signal generated by the oscillator 12 as well as a signal proportional to the frequency of the signal generated by the voltage controlled oscillator 10—these signals being continuously added at a summing network 18 with the externally developed signal.

In particular, to develop a signal proportional to the fixed frequency signal generated by the oscillator 12, the present invention includes a frequency discriminator represented at 20. The frequency discriminator 20 produces a direct current voltage signal having a magnitude which is directly proportional to the frequency of the fixed frequency signal. As represented, the voltage signal produced by the discriminator 20 is applied to an input terminal 22 of the summing network 18.

To develop a signal proportional to the frequency of the signal generated by the voltage controlled oscillator 10, the present invention includes a frequency discriminator 24. In particular, the frequency discriminator 24 acts as a negative feedback network between the output and input of the voltage controlled oscillator 10. The frequency discriminator 24 produces a voltage signal which is proportional to the frequency of the signal generated by the voltage controlled oscillator 10 and, as represented, is of opposite polarity relative to the direct current voltage signal produced by the discriminator 20. As represented, the negative feedback voltage signal developed by the discriminator 24 is applied to an input terminal 26 of the summing network 18. Accordingly, a negative feedback loop is produced which includes the voltage controlled oscillator 10, the discriminator 24, and a direct current amplifier represented at 28. Due to this negative feedback loop, the voltage appearing at the input terminal 26 of the summing network 18 tends to be equal to the sum of the voltage signals developed at the input terminals 22 and 30. Thus, a nearly zero voltage signal is normally developed at an output terminal 32 of the summing network 18.

In view of this, when no input signal is applied at input terminal 30, the voltage developed by the frequency discriminator 24 tends to equal that developed by the frequency discriminator 20. When the frequency discriminators are of the same type and include similar components, the frequency of the signal generated by the voltage controlled oscillator 10 hence tends to equal the frequency of the signal generated by the oscillator 12. When this occurs, the frequency of the output signal passed by the low-pass filter 16 is equal to zero frequency.

Further, when the loop gain of the negative feedback loop is high, the drift or change in the output frequency of the voltage controlled oscillator 10 with no change in input depends wholly upon the drift of the direct current amplifier 28 and the discriminators 20 and 24. Since the discriminators 20 and 24 are of the same type and of similar components, their drifts, which are due to changes in temperature, cancel. Thus, since the drift for direct current amplifiers may be made quite small, the overall drift of the system as described may be negligible. Also, due to the negative feedback loop, neither of the oscillators 10 or 12 need be stable since any change in the frequency of the signal generated by the oscillators 10 and 12 is compensated for by the negative feedback loop. Further, the voltage controlled oscillator 10 need not be linear since non-linearities are reduced by the negative feedback.

In operation, due to the negative feedback signal provided by the discriminator 24, when an input signal is applied to the input terminal 30, the frequency of the signal generated by the voltage controlled oscillator is rapidly increased thereby resulting in an increase in the voltage developed by the discriminator 24, which in turn balances the increase in voltage appearing at the summing network 18. Accordingly, the voltage appearing at the output terminal 32 of the summing network 18 is again reduced to zero magnitude. However, due to the increase in the frequency of the signal generated by the voltage controlled oscillator 10, the output signal now has a frequency equal to the difference between $f_1$ and $f_2$, this frequency being directly proportional to the magnitude of the signal applied at the input terminal 30.

Accordingly, when the present invention is utilized in the low level signal integrator system as briefly described above, an increase in the voltage applied at the input terminal 30 is reflected directly as an increase from zero frequency in the output signal developed by the present invention. As represented, the output signal may, in that embodiment, be applied to a frequency counter 34 which accurately counts the number of oscillations of the signal generated by the present invention to store a count which is an accurate measure of the integral of the wave form of the signal applied at the input terminal 30.

What is claimed is:

1. Apparatus for generating an alternating current output signal having a frequency which is directly proportional to the magnitude of an externally developed input signal applied thereto comprising: a variable frequency signal source for generating an alternating current signal at its output having a frequency which varies as a function of the magnitude of a signal applied to its input; means including a frequency discriminator coupled between the output and input of said variable frequency signal source for developing a negative feedback signal, the magnitude of said negative feedback signal being proportional to the frequency of the signal generated by said variable frequency signal source; a fixed frequency signal source for generating a signal having a fixed frequency; means including a frequency discriminator coupled between said fixed frequency signal source and the input of said variable frequency signal source for developing a direct current signal having a magnitude which is proportional to the fixed frequency signal, said direct current signal being of opposite polarity to said negative feedback signal; means for adding said direct current signal and said negative feedback signal at the input of said variable frequency signal source such that said variable frequency source in the absence of an externally developed input signal to its input is caused to generate a signal having a frequency substantially equal to the fixed frequency signal; means coupled to said fixed frequency signal source and said variable frequency signal source for producing an output signal having a frequency substantially equal to a difference between the fixed frequency and the frequency of the signal generated by said variable frequency signal source; and means for applying an externally developed direct current input signal to the input of said variable frequency source to selectively vary the frequency of said output signal.

2. Apparatus for generating an output signal having a frequency which is directly proportional to the magnitude of an externally developed input signal applied thereto comprising: a controllable frequency signal source for generating a signal at its output which has a frequency substantially proportional to the magnitude of a control signal applied at its input; means for producing said control signal including means coupled to the output of said controllable signal source for developing a negative feedback signal having a magnitude which is proportional to the frequency of the signal generated by said controllable signal source, a fixed frequency signal source, means for producing a voltage signal proportional to the frequency of the signal generated by said fixed frequency source, and combining means coupled to the input of said controllable signal source for continuously adding the externally developed input signal with the voltage signal and the negative feedback signal to produce said control signal; and means responsive to the signal generated by said fixed frequency source and the signal generated by said controllable signal source for producing the output signal having a frequency equal to a difference between the fixed frequency and the frequency of the signal generated by said controllable signal source.

3. Apparatus for generating an alternating current output signal having a frequency directly proportional to the magnitude of an externally developed input signal applied thereto comprising: a voltage controlled oscillator for generating a signal at its output which has a frequency proportional to the magnitude of voltage signal applied at its input; means coupled between the output and input of said voltage controlled oscillator for developing a negative feedback voltage at the input of said voltage controlled oscillator, the magnitude of said negative feedback voltage being proportional to the frequency of the signal generated by said voltage controlled oscillator; a fixed frequency oscillator for generating a signal having a fixed frequency; means coupled between said fixed frequency oscillator and the input of said voltage controlled oscillator for developing a voltage signal having a magnitude which is proportional to the fixed frequency, said voltage signal being of opposite polarity to said negative feedback signal; means coupled to the input of said voltage controlled oscillator for adding the voltage signal, the negative feedback signal, and an externally developed input voltage to develop a resultant voltage signal; means for applying the resultant voltage signal to the input of the voltage controlled oscillator; modulation means coupled between the output of said voltage controlled oscillator and said fixed frequency oscillator for developing a signal including a signal component having a frequency equal to a difference between the frequency of the signal generated by said voltage controlled oscillator and the fixed frequency; and a low-pass filter coupled to said frequency modulator for passing said signal component and rejecting undesired signal components.

4. Apparatus for generating an output signal having a frequency which is directly proportional to the magnitude of an externally developed input signal applied thereto comprising: a controllable frequency signal source for generating a signal at its output having a frequency substantially proportional to the magnitude of a signal applied at its input; means coupled between the output and input of said controllable frequency source for developing a negative feedback signal at the input of said controllable frequency source, said negative feedback signal having a magnitude which is proportional to the frequency of the signal generated by said controllable frequency source; a fixed frequency signal source for generating a signal having a fixed frequency; means coupled to said fixed frequency source for developing a direct current signal at the input of said controllable frequency source which is proportional to the fixed frequency, said direct current signal being of opposite polarity to said negative feedback signal; means for adding said direct current signal and said negative feedback signal to an externally developed input signal to produce a resultant signal; and amplifying means for applying said resultant signal to the input of said voltage controlled oscillator to cause said voltage controlled oscillator to generate a signal having a frequency which is directly proportional to the magnitude of said externally developed input signal.

5. Apparatus for developing an alternating current signal having a frequency which is directly proportional to the magnitude of an input signal applied thereto comprising a controllable frequency signal source for generating a signal at its output having a frequency which is substantially proportional to the magnitude of a signal applied to its input, negative feedback means coupled between the output and input of said controllable frequency signal source, a fixed frequency signal source for generating a signal having a fixed frequency, means coupled to said fixed frequency signal source for developing a direct current signal having a magnitude which is directly proportional to the fixed frequency, said direct current signal having a polarity which is opposite to the negative feedback signal, and means for adding the direct current signal with the negative feedback signal at the input of the controllable frequency signal source.

6. Apparatus defined in claim 5 including means coupled between the output of said controllable frequency signal source and said fixed frequency signal source for developing an output signal having a frequency which is substantially equal to the difference between the frequency of the signal developed by said controllable frequency signal source and the fixed frequency.

7. Apparatus for generating a variable frequency output signal having a frequency which is directly proportional to the magnitude of an input signal applied thereto comprising: means for generating at an output terminal an output signal having a frequency equal to a frequency difference between signals generated by a variable frequency signal source and a fixed frequency signal source; and means for selectively varying the frequency of said output signal by varying the frequency of the signal generated by said variable frequency signal source, the frequency varying means including negative feedback means coupled between the input and output of the variable frequency signal source, means for developing at the input of the variable frequency signal source a signal having a magnitude proportional to the signal generated by the fixed frequency signal source, and means for applying the input signal to the input of the variable frequency signal source.

8. Apparatus for generating an output signal having a frequency which is directly proportional to the magnitude of an input signal applied thereto comprising: means for generating a fixed frequency signal; means for generating a variable frequency signal; means for developing an output signal having a frequency which is equal to a difference between the fixed frequency and the variable frequency signals; and means for selectively controlling the frequency of said output signal to be directly proportional to the magnitude of an input signal applied to said means for generating said variable frequency signal including means for developing a first direct current signal proportional to the frequency of the fixed frequency signal, means for developing a second direct current signal proportional to the frequency of the variable frequency signal, said second direct current signal being of opposite polarity relative to the first direct current signal, and means coupled to the input of said means for generating the variable frequency signal for adding said first and second direct current signals.

No references cited.